United States Patent
Fujiwara

(10) Patent No.: US 12,265,705 B2
(45) Date of Patent: Apr. 1, 2025

(54) CONTROL APPARATUS, DISPLAY SYSTEM, METHOD, AND NON-TRANSITORY COMPUTER READABLE MEDIUM STORING PROGRAM FOR CONTROLLING DISPLAYED IMAGES IN RESPONSE TO POSITIONAL CHANGE OF TERMINAL DEVICE

(71) Applicant: FUJIFILM Business Innovation Corp., Tokyo (JP)

(72) Inventor: Momoko Fujiwara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 733 days.

(21) Appl. No.: 17/380,036

(22) Filed: Jul. 20, 2021

(65) Prior Publication Data
US 2022/0308749 A1 Sep. 29, 2022

(30) Foreign Application Priority Data
Mar. 26, 2021 (JP) .................. 2021-053350

(51) Int. Cl.
*G06F 3/048* (2013.01)
*G06F 3/0482* (2013.01)
(Continued)

(52) U.S. Cl.
CPC ........ *G06F 3/04886* (2013.01); *G06F 3/0482* (2013.01); *G06F 3/04842* (2013.01); *H04N 23/62* (2023.01); *H04N 23/667* (2023.01)

(58) Field of Classification Search
CPC .............. G06F 3/04886; G06F 3/0482; G06F 3/04842; H04N 23/667; H04N 23/62
See application file for complete search history.

(56) References Cited

U.S. PATENT DOCUMENTS

| | | | |
|---|---|---|---|
| 10,176,783 | B2 | 1/2019 | Travers et al. |
| 10,591,729 | B2 | 3/2020 | Watanabe et al. |

(Continued)

FOREIGN PATENT DOCUMENTS

| | | |
|---|---|---|
| JP | H07146950 | 6/1995 |
| JP | 2014174507 | 9/2014 |

(Continued)

OTHER PUBLICATIONS

"Notice of Reasons for Refusal of Japan Counterpart Application", issued on Sep. 17, 2024, with English translation thereof, p. 1-p. 6.

*Primary Examiner* — David Phantana-angkool
(74) *Attorney, Agent, or Firm* — JCIPRNET

(57) ABSTRACT

A control apparatus controls a display device equipped with a display unit, and controls the display device that allows a user to view back of the display unit through the display unit in a case where the user views the display unit, and the control apparatus includes a processor configured to: change display of some of images displayed on the display unit, in response to a change in a position of a terminal device with respect to the display device, the terminal device being located behind the display unit and viewed by the user through the display unit, and maintain some other images displayed on the display unit in a state of being displayed at predetermined places, regardless of the change in the position of the terminal device.

18 Claims, 11 Drawing Sheets

(51) Int. Cl.
*G06F 3/04842* (2022.01)
*G06F 3/04886* (2022.01)
*H04N 23/62* (2023.01)
*H04N 23/667* (2023.01)

(56) References Cited

U.S. PATENT DOCUMENTS

| | | | | |
|---|---|---|---|---|
| 10,762,716 | B1* | 9/2020 | Paul | G06F 3/016 |
| 11,113,883 | B2* | 9/2021 | Zia | G06T 19/006 |
| 11,195,307 | B2* | 12/2021 | Kasahara | G06F 3/017 |
| 11,829,595 | B1* | 11/2023 | Aggarwal | G06F 30/13 |
| 11,941,762 | B2* | 3/2024 | Sonasath | G06T 19/006 |
| 2016/0292922 | A1 | 10/2016 | Kasahara | |
| 2019/0340790 | A1* | 11/2019 | Kasahara | G06T 3/60 |
| 2019/0378621 | A1* | 12/2019 | Ellison | G06F 3/011 |
| 2020/0357184 | A1* | 11/2020 | Paul | G06F 3/04886 |
| 2021/0019946 | A1* | 1/2021 | Sonasath | G06T 7/33 |
| 2021/0097776 | A1* | 4/2021 | Faulkner | G06F 3/04842 |
| 2021/0191600 | A1* | 6/2021 | Lemay | G06F 3/0485 |
| 2022/0091722 | A1* | 3/2022 | Faulkner | G06T 19/003 |
| 2022/0253136 | A1* | 8/2022 | Holder | G06F 3/04815 |
| 2023/0093979 | A1* | 3/2023 | Stauber | G06F 3/017 |
| | | | | 345/419 |
| 2023/0252739 | A1* | 8/2023 | Wu | H04L 67/131 |
| | | | | 345/633 |
| 2023/0273706 | A1* | 8/2023 | Smith | G06F 3/04815 |
| | | | | 345/419 |
| 2023/0410441 | A1* | 12/2023 | Moll | G06T 19/006 |
| 2024/0036699 | A1* | 2/2024 | Ebbole | G06F 3/0304 |
| 2024/0062491 | A1* | 2/2024 | Velasquez | G06T 19/006 |
| 2024/0066405 | A1* | 2/2024 | Ganschow | G06T 11/00 |
| 2024/0070999 | A1* | 2/2024 | Logan | G06F 3/0482 |
| 2024/0203066 | A1* | 6/2024 | Kawashima | G06F 3/04842 |

FOREIGN PATENT DOCUMENTS

| | | |
|---|---|---|
| JP | 2016507970 | 3/2016 |
| JP | 2017058528 | 3/2017 |
| WO | 2014188798 | 11/2014 |
| WO | 2016194844 | 12/2016 |

* cited by examiner

CONTROL APPARATUS, DISPLAY SYSTEM, METHOD, AND NON-TRANSITORY COMPUTER READABLE MEDIUM STORING PROGRAM FOR CONTROLLING DISPLAYED IMAGES IN RESPONSE TO POSITIONAL CHANGE OF TERMINAL DEVICE

CROSS-REFERENCE TO RELATED APPLICATIONS

This application is based on and claims priority under 35 USC 119 from Japanese Patent Application No. 2021-053350 filed Mar. 26, 2021.

BACKGROUND

(i) Technical Field

The present invention relates to a control apparatus, a display system, method, and a non-transitory computer readable medium storing a program.

(ii) Related Art

JP2016-507970A discloses a process in which an application management and communication system manages and starts an application in a wearable display device via a user interface of a portable display device.

JP2014-174507A discloses a multi-display system including an information terminal that displays a real screen and an augmented reality display device that displays a virtual screen that is an augmented reality display screen different from the real screen.

SUMMARY

In a case where a terminal device referenced by the user is displayed on the display unit referenced by the user, in a case where the display content of the display unit is changed according to the movement of the terminal device, for example, the display position of the image displayed on the display unit is changed, according to the position of the terminal device.

Incidentally, in a case where the operation terminal is moved, the display is changed for all the images displayed on the display unit, and the layout of the display unit is largely changed, it is difficult to grasp the contents displayed on the display unit.

Aspects of non-limiting embodiments of the present disclosure relate to a control apparatus, a display system, and a non-transitory computer readable medium storing a program that allow the user to more easily grasp the display contents, as compared with the case where the display is changed for all the images displayed on the display unit, in a case where the position of the operation terminal viewed through the display unit is changed with respect to the display unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control apparatus that controls a display device equipped with a display unit, and controls the display device that allows a user to view back of the display unit through the display unit in a case where the user views the display unit, the control apparatus including a processor configured to: change display of some of images displayed on the display unit, in response to a change in a position of a terminal device with respect to the display device, the terminal device being located behind the display unit and viewed by the user through the display unit; and maintain some other images displayed on the display unit in a state of being displayed at predetermined places, regardless of the change in the position of the terminal device.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
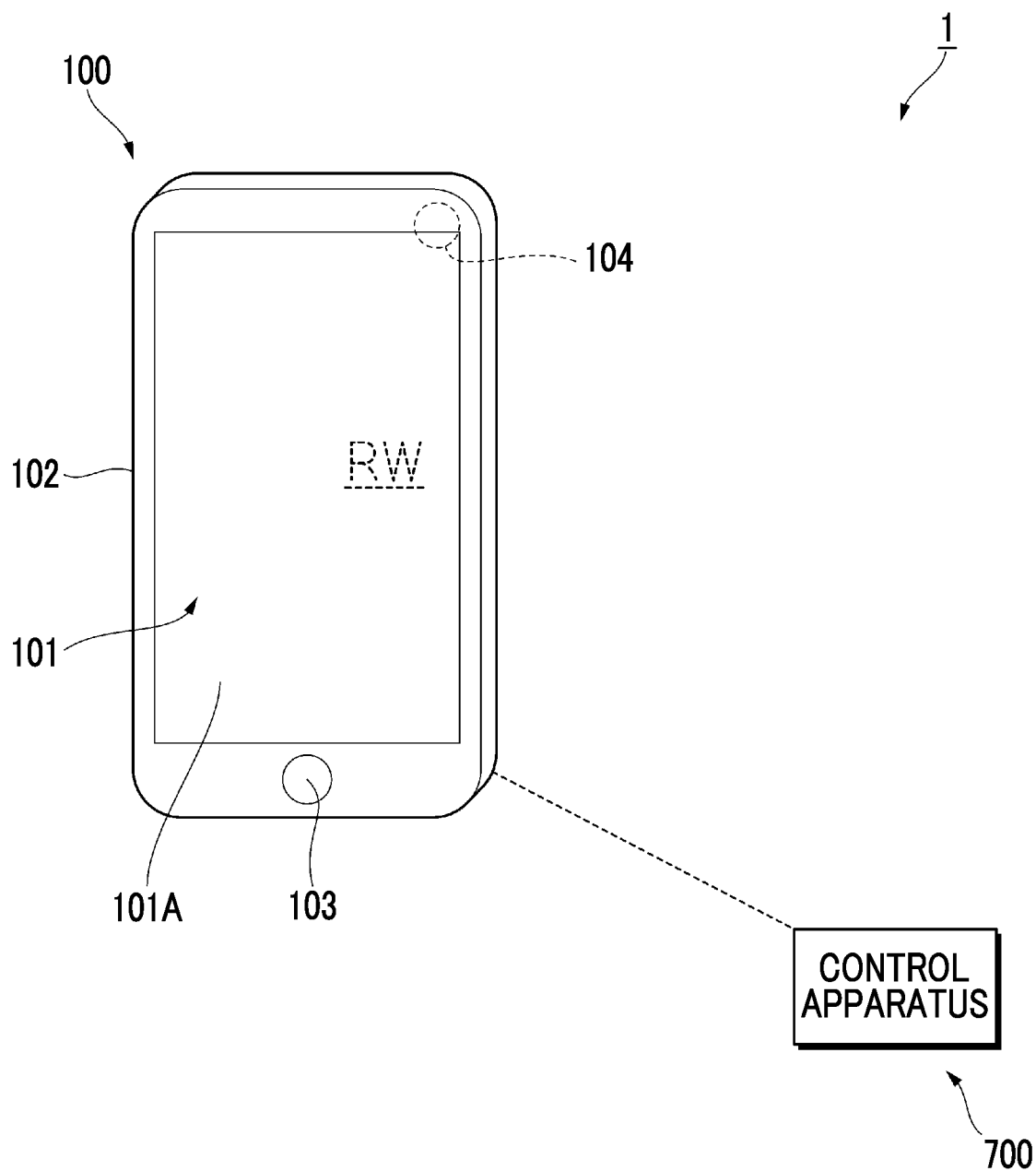
FIG. 1 is a diagram illustrating an example of a display system.

FIG. 1 is a diagram illustrating an example of a display system 1 of the present exemplary embodiment.

The display system 1 of the present exemplary embodiment is provided with a display device 100 and a control apparatus 700 for controlling the display device 100.

The display device 100 is a so-called Augmented Reality (AR) display device that displays an image in a real space viewed by the user.

The display device 100 is provided with a display unit 101 that the user can view. The display unit 101 is formed in a rectangular shape. The display unit 101 is not particularly limited as long as it can display an image, and examples of the display unit include a liquid crystal display or an organic EL display.

Further, the display device 100 is provided with a housing 102 that supports the display unit 101. Further, the display device 100 is provided with a speaker (not illustrated) for outputting sound and an operation button 103 for receiving an instruction from the user.

Further, the display device 100 may be a so-called head-mounted type or eyeglass-type display device, and in this case, a mounted portion to be mounted on the user's head is provided.

Further, the display device 100 may be a tablet-type display device 100 as illustrated in FIG. 1, and in this case, the display unit 101 is provided on one surface side of the plate-shaped housing 102.

Hereinafter, in the present specification, the head-mounted type display device 100 or the eyeglass-type display device 100 is referred to as a "wearable display device 100", and a display device 100 supported by a user's hand such as a tablet-type display device 100 is referred to as a "support-type display device 100".

Further, the display device 100 of the present exemplary embodiment is provided with a camera 104 that acquires an image of the back of the display unit 101.

Here, "back of the display unit 101" refers to the back side of the image display surface 101A included in the display unit 101 formed in a planar shape. In other words, "back of the display unit 101" refers to a place located ahead of the line of sight of the user who views the display unit 101 from the front and located behind the image display surface 101A of the display unit 101.

The camera 104 provided in the display device 100 images the back of the display unit 101, from the upstream side in the direction in which the line of sight of the user who is viewing the display unit 101 faces, and acquires the image of the back.

In the present exemplary embodiment, a case where the control apparatus 700 is provided separately from the display device 100 will be described as an example.

However, the present invention is not limited to this, and the control apparatus 700 may be provided as a part of the display device 100. In other words, the control apparatus 700 may be provided in the housing 102 provided in the display device 100.

As described above, the display device 100 is a so-called AR display device, and in the present exemplary embodiment, in a case where the user views the display unit 101, the user views an object or situation behind the display unit 101 through the display unit 101.

In order to enable the user to view the back of the display unit 101 through the display unit 101, for example, the image acquired by the camera 104 that acquires the image of the back of the display unit 101 is displayed on the display unit 101.

In addition, for example, the display unit 101 may be configured to transmit light. In this case, the display unit 101 is transparent, and the user views the back of the display unit 101 through the transparent display unit 101.

As described above, there are two types of display devices 100, that is, a display device 100 provided with a display unit 101 through which light is transmitted, and a display device 100 provided with a display unit 101 through which light is not transmitted and on which the image obtained by the camera 104 is displayed.

Hereinafter, as necessary, in the present specification, the display device 100 provided with the display unit 101 through which light is transmitted is referred to as a "transparent display device 100", and the display device 100 provided with the display unit 101 through which light is not transmitted and on which the image obtained by the camera 104 is displayed is referred to as a "non-transparent display device 100".

In other words, hereinafter, in the present specification, a display device 100 that allows the user to view the back of the display unit 101 through a transparent display unit 101 is referred to as a "transparent display device 100", and a display device 100 on which the image acquired by the camera 104 is displayed on the display unit 101 is referred to as a "non-transparent display device 100".

In the present exemplary embodiment, an image other than the image obtained by the camera 104, such as the content described later, is displayed on the display unit 101. Thus, the image displayed on the display unit 101 is superimposed on the real space RW located behind the display unit 101 and viewed by the user.

Explanation of Control Apparatus 700

Figure 2:
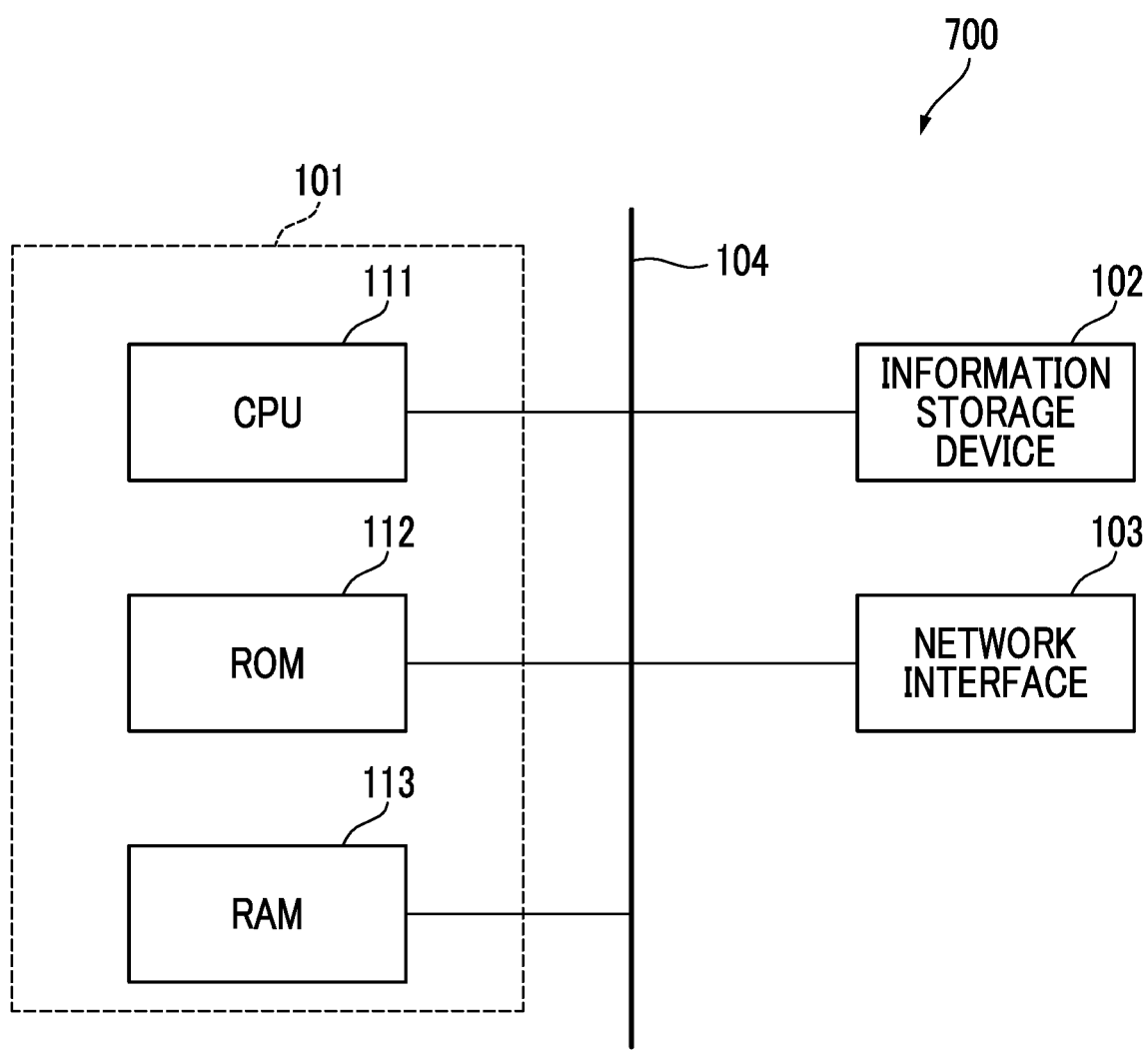
FIG. 2 is a diagram illustrating an example of a hardware configuration of a control apparatus.

FIG. 2 is a diagram illustrating an example of a hardware configuration of a control apparatus 700.

The control apparatus 700 includes a control unit 101, an information storage device 102 that stores information, and a network interface 103 that achieves communication via a Local Area Network (LAN) cable or the like.

The control unit 101 includes a Central Processing Unit (CPU) 111 as an example of a processor, a Read Only Memory (ROM) 112 in which basic software, a Basic Input Output System (BIOS), and the like are stored, and a Random Access Memory (RAM) 113 to be used as a work area.

The CPU 111 may be multi-core. Further, the ROM 112 may be a rewritable non-volatile semiconductor memory. The control unit 101 is a so-called computer.

Examples of the information storage device 102 include a hard disk drive. However, the information storage device 102 may be a semiconductor memory or a magnetic tape.

The control unit 101, the information storage device 102, and the network interface 103 are connected to each other through a bus 104 or a signal line (not illustrated).

Here, the program to be executed by the CPU 111 can be provided to the control apparatus 700 by being stored in a computer readable recording medium such as a magnetic recording medium (a magnetic tape, a magnetic disk, etc.), an optical recording medium (optical disk, etc.), an optical magnetic recording medium, or a semiconductor memory.

Further, the program to be executed by the CPU 111 may be provided to the control apparatus 700 by using a communication means such as the Internet.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Explanation of Display Processing

In the present exemplary embodiment, the CPU 111 as an example of the processor controls the display unit 101 provided in the display device 100, and changes the display on the display unit 101.

Specifically, in a case where the terminal device 300 (described later) is located behind the display unit 101, the CPU 111 changes the display of some of the images displayed on the display unit 101, in response to the change in the position of the terminal device 300 with respect to the display device 100.

More specifically, the CPU 111 changes display of some of the images displayed on the display unit 101, in response to a change in the position of the terminal device 300 located behind the display unit 101 and viewed by the user through the display unit 101 with respect to the display device 100.

"The user views through the display unit 101" includes an aspect in which the user directly views an object that is visible through the display unit 101, or an aspect in which the user views by looking at the image acquired by the camera 104 provided in the display device 100, on the display unit 101.

In other words, "the user views through the display unit 101" includes an aspect in which the user views an object behind the display unit 101 through the display unit 101 provided in the transparent display device 100, or an aspect in which a user views an image of the object displayed on the display unit 101 provided in the non-transparent display device 100.

On the other hand, even in a case where the terminal device 300 is located behind the display unit 101 and the position of the terminal device 300 changes, the CPU 111 maintains some other images displayed on the display unit 101 in a state of being displayed at a predetermined place, regardless of the change in the position of the terminal device 300.

In the present exemplary embodiment, the positions of all the images displayed on the display unit 101 are not changed, and some of the images are maintained in a state of being displayed at a predetermined place.

Explanation of Terminal Device 300

The "terminal device 300" refers to a device that can be carried by a user.

Examples of the terminal device 300 include smartphones and tablets. In addition, examples of the terminal device 300 include a game machine, a smart watch, a mobile notebook PC, and the like.

Figure 3:
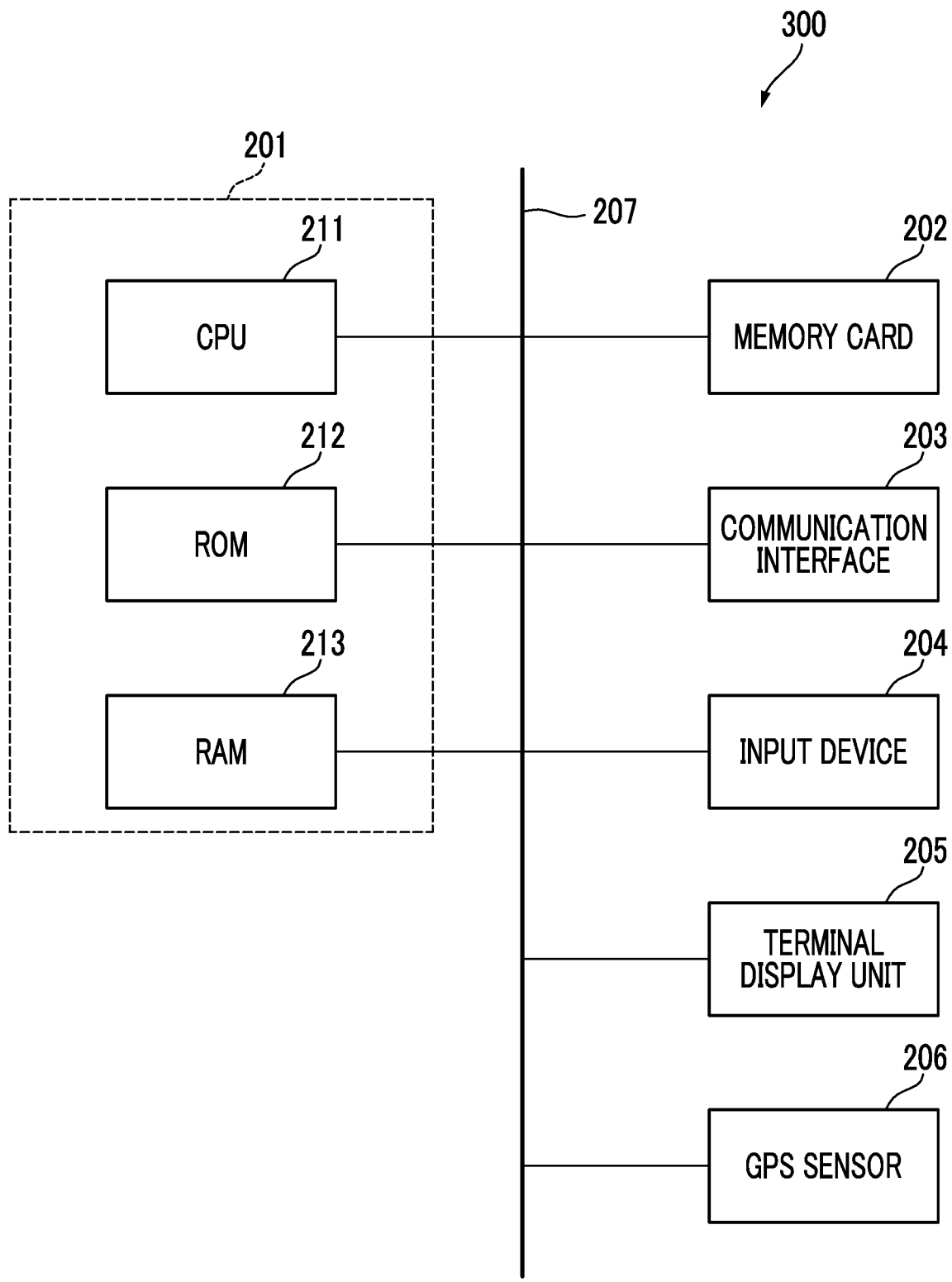
FIG. 3 is a diagram illustrating an example of a hardware configuration of a terminal device.

FIG. 3 is a diagram illustrating an example of a hardware configuration of the terminal device 300. The configuration illustrated in FIG. 3 assumes the case where the terminal device 300 is a smartphone.

The terminal device 300 includes a control unit 201 that controls the operation of the entire device, a memory card 202 that stores various types of data, various communication interfaces 203 that comply with wireless communication standards, and an input device 204 such as a touch sensor.

Further, the terminal device 300 has a terminal display unit 205, which is a display unit composed of a liquid crystal display, an organic Electro Luminescence (EL) display, and the like, and a Global Positioning System (GPS) sensor 206.

The control unit 201 has a CPU 211, a ROM 212 in which firmware, a BIOS, and the like are stored, and a RAM 213 used as a work area.

The CPU 211 may be multi-core. Further, the ROM 212 may be a rewritable non-volatile semiconductor memory.

The communication interface 203 is, for example, an interface used for connecting to a mobile communication system and an interface used for connecting to a wireless LAN.

The GPS sensor 206 is a sensor that receives radio waves from GPS satellites and measures the position of the terminal device 300. The latitude, longitude, and altitude information output from the GPS sensor 206 gives the current position of the terminal device 300. The GPS sensor 206 may be compatible with an indoor positioning system.

In the present exemplary embodiment, in a case where the user moves the terminal device 300, the CPU 111 changes the display of some of the images displayed on the display unit 101, as described above.

The CPU 111 maintains some other images displayed on the display unit 101 in a state of being displayed at predetermined places, even in a case where the user moves the terminal device 300.

Specific Example of Display on Display Unit 101

Figure 4:
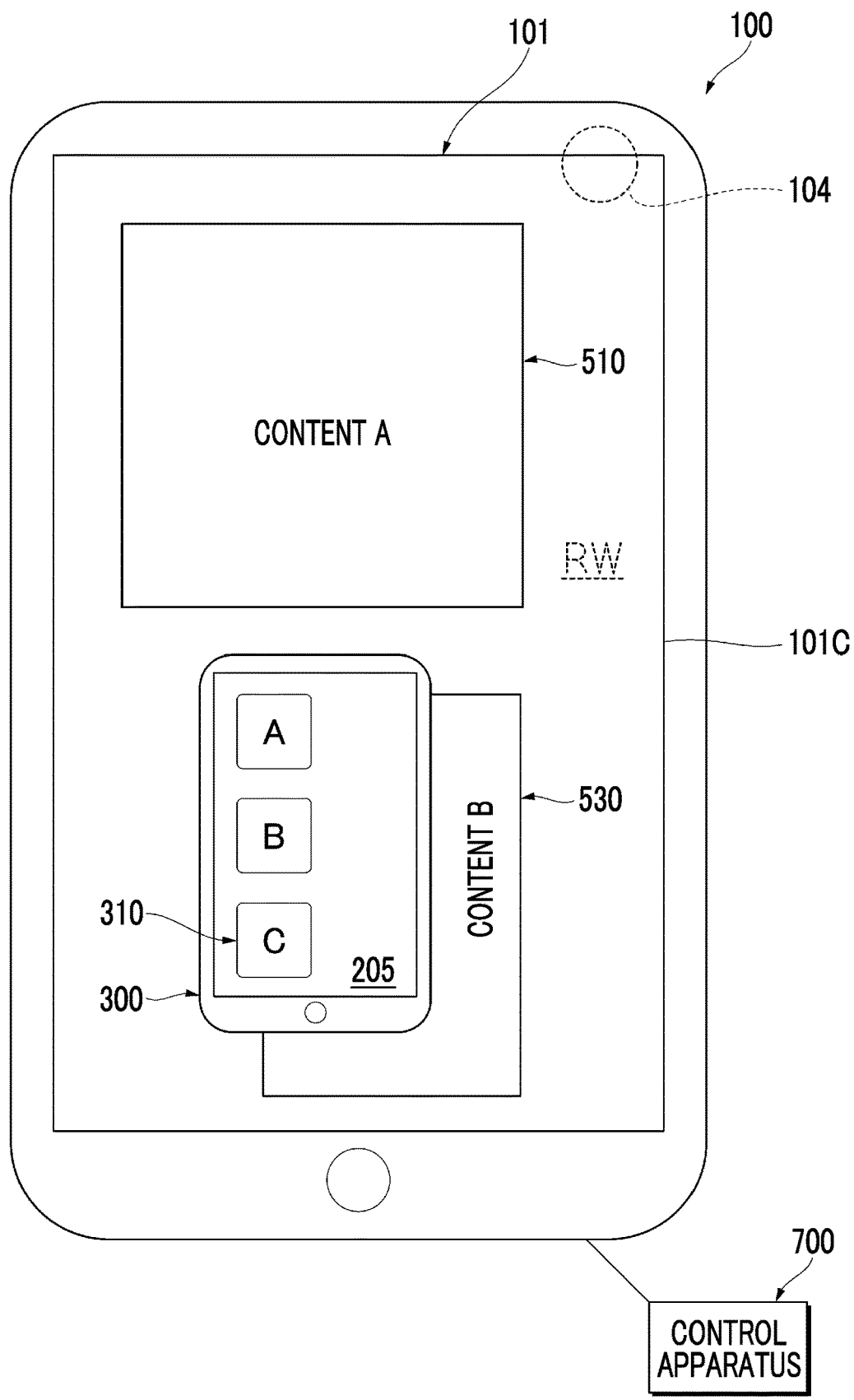
FIG. 4 is a diagram illustrating a display example in a display unit.

FIG. 4 is a diagram illustrating a display example in the display unit 101.

In this display example, a first virtual screen 510 and a third virtual screen 530 are displayed on the display unit 101. A second virtual screen 520 will be described later.

Further, in this display example, the terminal device 300 held by the user with his or her left hand (not illustrated) is located behind the display unit 101, and the user views the terminal device 300 through the display unit 101.

Here, the "virtual screen" is an image displayed on the display unit 101 under the control of the control apparatus 700, and is an image that can be viewed by the user together with the real space RW present behind the display unit 101.

In the present exemplary embodiment, the first virtual screen 510 is located above the terminal device 300 that is visible through the display unit 101. The CPU 111 maintains the first virtual screen 510 in a state of being displayed at a predetermined place, even in a case where the position of the terminal device 300 changes.

Specifically, the first virtual screen 510 is displayed on the upper side of the display unit 101, which is a predetermined place, and the CPU 111 maintains the first virtual screen 510 in a state of being displayed on the upper side of the display unit 101, regardless of the change of the position of the terminal device 300.

More specifically, the CPU 111 outputs a control signal for displaying the first virtual screen 510 on the upper side of the display unit 101, even in a case where the terminal device 300 is moved.

Here, a case where the first virtual screen 510 is located on the upper side of the display unit 101 and the first virtual screen 510 is maintained in a state of being displayed on the upper side is maintained will be described as an example.

Incidentally, the present invention is not limited to this, and the first virtual screen 510 may be displayed on the lower side of the display unit 101, and the first virtual screen 510 is maintained in a state of being displayed on the lower side of the display unit 101 may be maintained.

Further, the present invention is not limited to this, and, for example, the first virtual screen 510 may be displayed on the right side or the left side of the display unit 101, and the first virtual screen 510 is maintained in a state of being displayed on the right side or the left side may be maintained.

The third virtual screen 530, which is the target of the display change, will be described.

The CPU 111 changes the display position of the third virtual screen 530, in response to a change in the position of the terminal device 300. Specifically, the CPU 111 moves the third virtual screen 530 in the direction in which the terminal device 300 is moved, in response to a change in the position of the terminal device 300.

Figure 5:
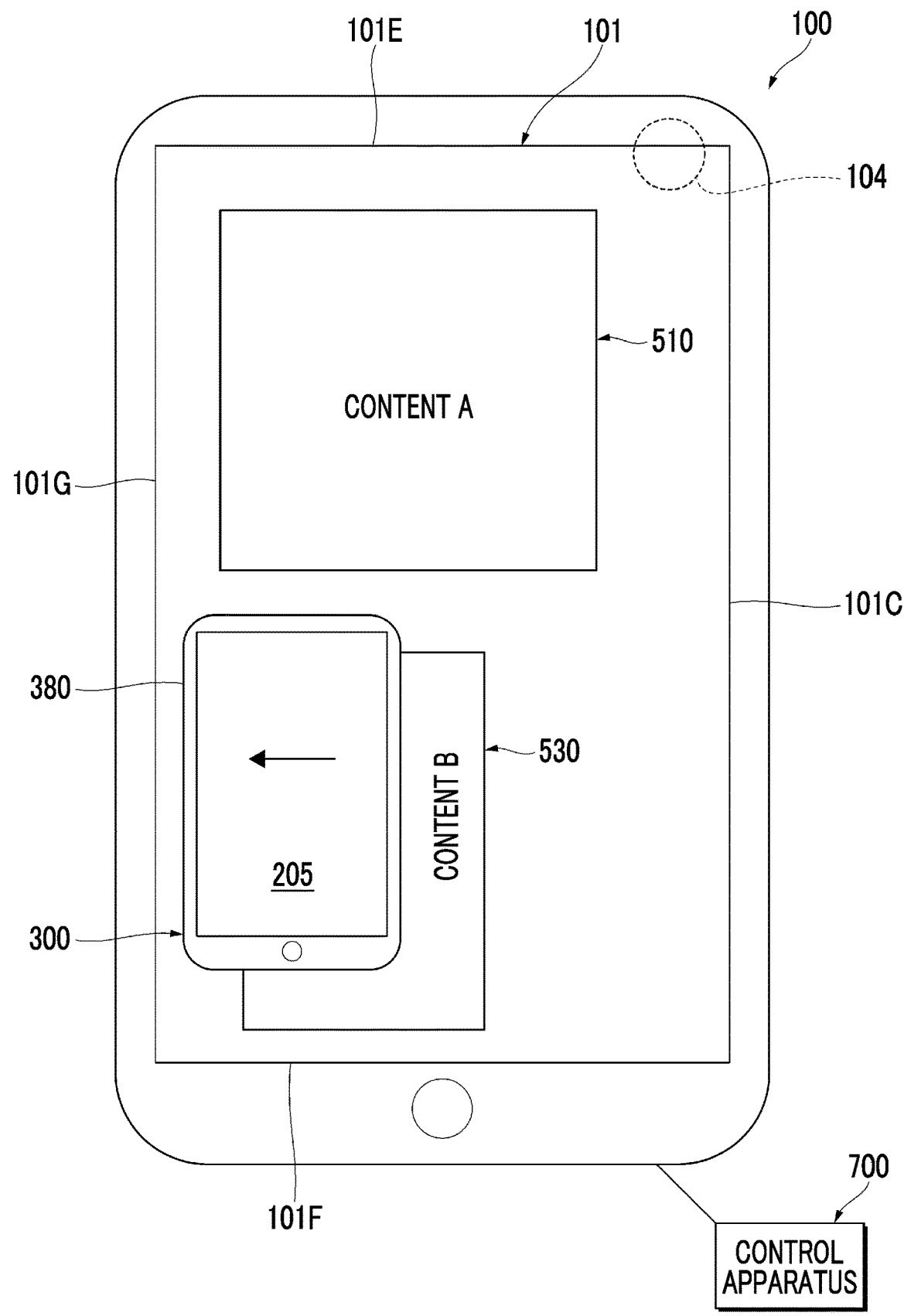
FIG. 5 is a diagram illustrating another display example in the display unit.

Specifically, for example, in a case where the terminal device 300 is moved from the state illustrated in FIG. 4 to the left as illustrated in FIG. 5 (a diagram illustrating another display example on the display unit 101), the CPU 111 moves the third virtual screen 530 such that the third virtual screen 530 is moved along with the terminal device 300.

Specifically, in a case of performing this process, the CPU 111 recognizes the position of the terminal device 300, and determines the display position of the third virtual screen 530 such that the third virtual screen 530 is displayed next to the recognized position of the terminal device 300.

Then, the CPU 111 outputs a control signal for displaying the third virtual screen 530 at this determined position. Thus, in the present exemplary embodiment, the third virtual screen 530 moves along with the terminal device 300.

The recognition of the position of the terminal device 300 by the CPU 111 is performed, for example, by analyzing the image acquired from the camera 104 provided in the display device 100.

The terminal device 300 may be recognized by recognizing the terminal device 300. For example, the terminal device 300 may be recognized by displaying an identification image for representing the terminal device 300 on the terminal display unit 205 provided in the terminal device 300, and recognizing this image.

In the present exemplary embodiment, a case where the third virtual screen 530 moves will be described as an example of changing the display of the third virtual screen 530. However, as the display change, in addition to the movement, for example, enlargement or reduction of the third virtual screen 530 can be mentioned.

For example, in a case where the terminal device 300 is moved from the state illustrated in FIG. 4 in a direction away from the display unit 101 and ahead of the user's line of sight (hereinafter, referred to as "line-of-sight direction"), the third virtual screen 530 may be reduced.

Further, for example, in a case where the terminal device 300 is moved in the direction approaching the display unit 101 and opposite to the line-of-sight direction from the state illustrated in FIG. 4, the third virtual screen 530 may be enlarged.

In addition, the third virtual screen 530 is moved along with the movement of the terminal device 300 in the left-right direction or the up-down direction, and the third virtual screen 530 may be enlarged or reduced, according to the movement of the terminal device 300 in the line-of-sight direction or the direction opposite to the line-of-sight direction.

Further, for example, in a case where the third virtual screen 530 moves to the right end portion 101C of the display unit 101 from the state illustrated in FIG. 4, the display area of the third virtual screen 530 disappears.

Figure 6:
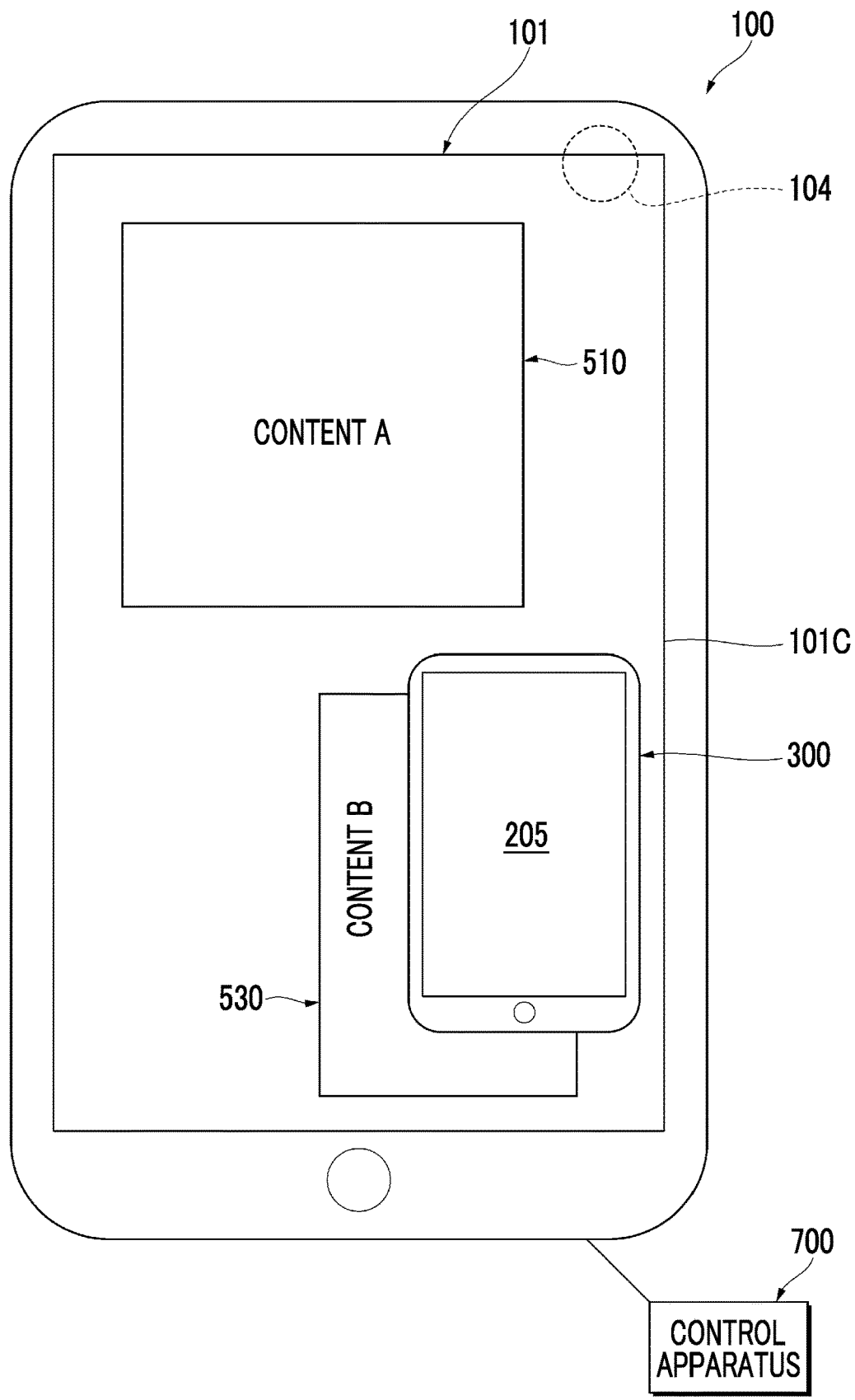
FIG. 6 is a diagram illustrating another display example in the display unit.

In this case, as illustrated in FIG. 6 (a diagram illustrating another display example on the display unit 101), the display position of the third virtual screen 530 with respect to the terminal device 300 may be changed.

In the example illustrated in FIG. 6, the left side of the terminal device 300 is a new display position of the third virtual screen 530, and the third virtual screen 530 is displayed at this new display position.

In addition, for example, it is assumed that the terminal device 300 is moved upward in FIG. 4 from the state illustrated in FIG. 4, and along with the movement, the first virtual screen 510 and the third virtual screen 530 overlap with each other.

In addition to the terminal device 300 moving upward in FIG. 4, for example, even in a case where from the state illustrated in FIG. 4, the user wearing the wearable display device 100 moves his or her head, or the user moves the support-type display device 100 downward, the first virtual screen 510 and the third virtual screen 530 overlap each other.

In this case, for example, the portion of the third virtual screen 530 that overlaps with the first virtual screen 510 is erased such that the first virtual screen 510 is displayed with priority.

In this case, the terminal device 300 is located behind the first virtual screen 510, but in a case where the display device 100 is the transparent display device 100, the terminal device 300 may be visible, or the terminal device 300 may not be visible, depending on the density of the first virtual screen 510.

Further, in the case of the configuration in which the display device 100 is a non-transparent display device 100 and the image of the terminal device 300 acquired by the camera 104 is displayed on the display unit 101, image processing may be performed to erase the part of an image representing the terminal device 300 overlapping with the first virtual screen 510.

The first virtual screen 510 and the third virtual screen 530 will be further described.

The first virtual screen 510 and the third virtual screen 530 of the present exemplary embodiment are images that are sequentially displayed on the display unit 101 by the user operating the terminal device 300.

In the present exemplary embodiment, in a case where the user operates the terminal device 300 to sequentially select selection items 310 (described later) such as thumbnail images displayed on the terminal device 300, the first virtual screen 510 and the third virtual screen 530 are displayed in order on the display unit 101.

In the present exemplary embodiment, the first virtual screen 510 and the third virtual screen 530 are images respectively representing the contents, and in a case where the user operates the terminal device 300 to select the selection item 310 such as a thumbnail image, the content corresponding to the selection item 310 is displayed on the display unit 101.

The user operates the terminal device 300 present in the real space RW to select the selection item 310. In other words, the user actually touches the terminal device 300 present in the real space RW to select the selection item 310.

Then, in the present exemplary embodiment, in response to this, the image (content) corresponding to the selection item 310 selected by the user is displayed on the display unit 101 as a virtual screen.

More specifically, in the present exemplary embodiment, information regarding the selection item 310 selected by the user is transmitted from the terminal device 300 to the control apparatus 700 through the communication line.

Then, in this case, the CPU 111 of the control apparatus 700 performs, for example, a process of downloading the content corresponding to the selection item 310 selected by the user from the external server, and further displays the downloaded content on the display unit 101.

Thus, the content corresponding to the selection item 310 selected by the user is displayed on the display unit 101 of the display device 100.

The third virtual screen 530 (see FIG. 4) is a higher-ranked image having a higher order of display on the display unit 101, and the first virtual screen 510 is a lower-ranked image having a lower order than the third virtual screen 530 which is the higher-ranked image.

In other words, the third virtual screen 530 is an image corresponding to the first selection item which is the selection item 310 first selected by the user, and the first virtual screen 510 is a screen corresponding to the selection item 310 which is selected by the user after the first selection item.

In the present exemplary embodiment, a case is assumed where the user operates the terminal device 300 and first selects the selection item 310 corresponding to the third virtual screen 530.

Figure 7:
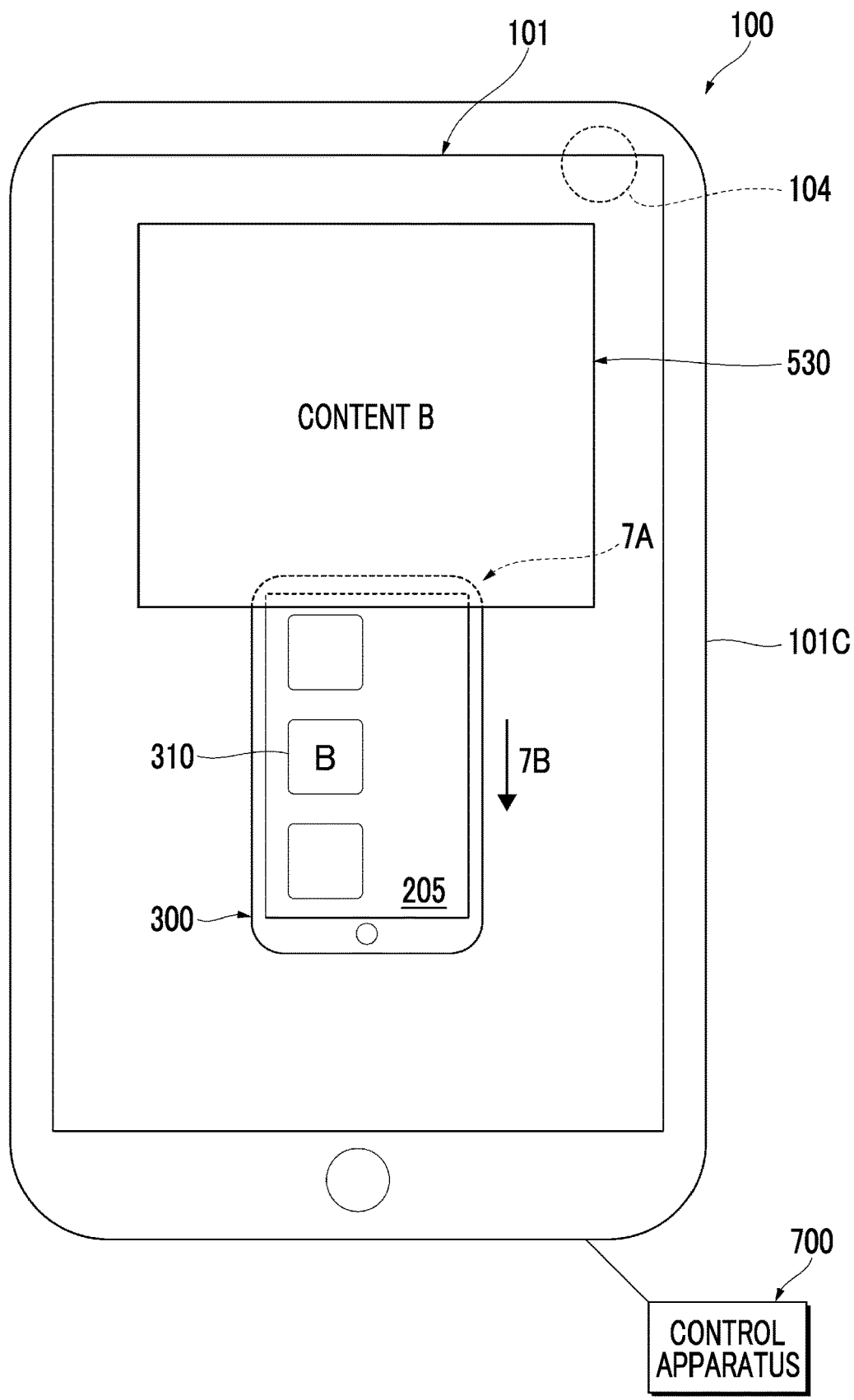
FIG. 7 is a diagram illustrating another display example in the display unit.

In this case, the display on the display unit 101 is first in a state illustrated in FIG. 7 (a diagram illustrating another display example on the display unit 101), and the third virtual screen 530 is displayed on the upper side of the display unit 101.

At this time, depending on the position of the terminal device 300, the terminal device 300 and the third virtual screen 530 overlap with each other, as illustrated by reference numeral 7A in FIG. 7.

In this case, in order to make the terminal display unit 205 of the terminal device 300 easier to view, the user moves the terminal device 300 downward, as illustrated by the arrow 7B in FIG. 7, moves the head wearing the wearable display device 100, or moves the support-type display device 100.

Figure 8:
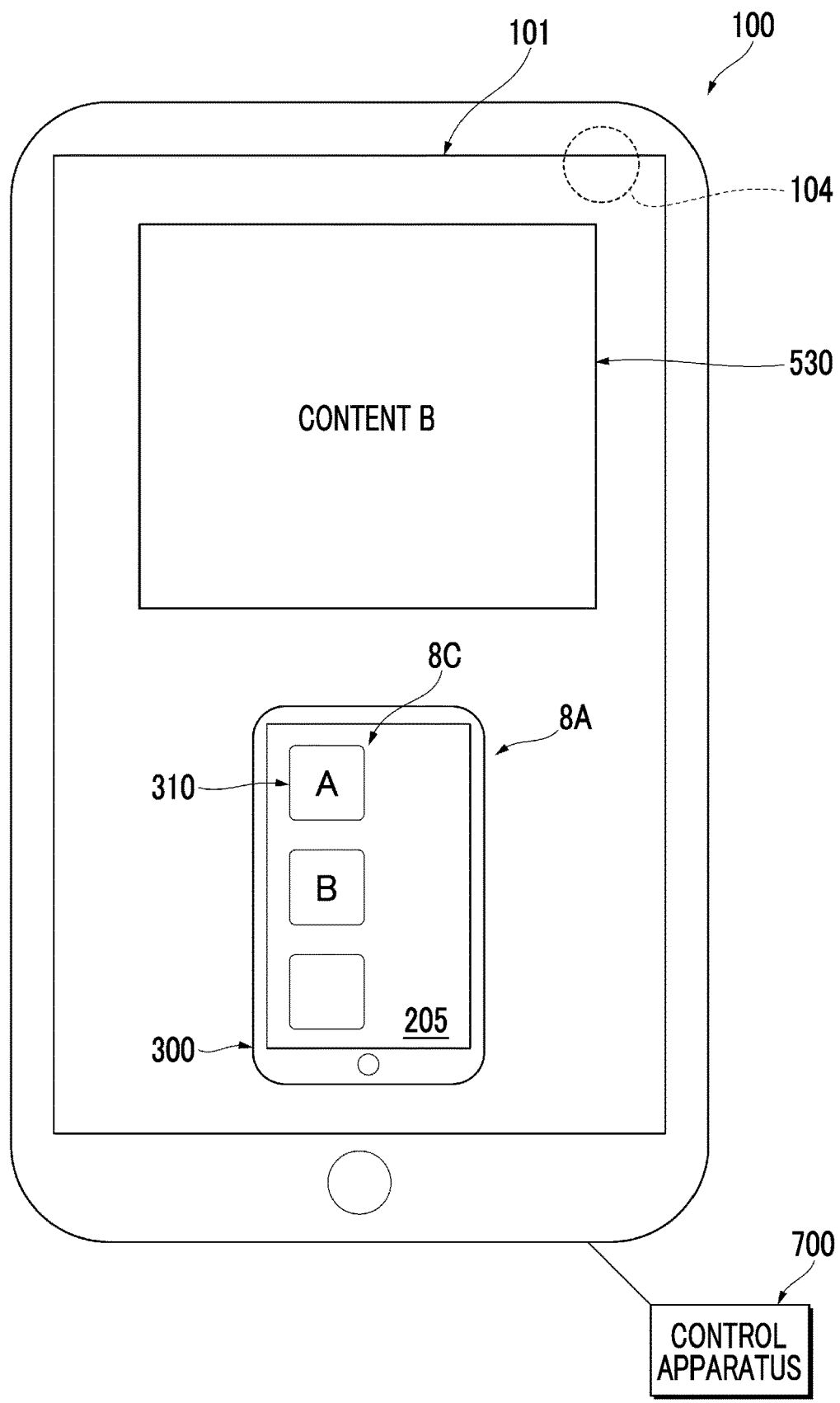
FIG. 8 is a diagram illustrating another display example in the display unit.

Thus, the terminal device 300 is located at the place indicated by reference numeral 8A in FIG. 8 (a diagram illustrating another display example on the display unit 101). In this case, the user can easily view the terminal display unit 205 of the terminal device 300.

Next, in this example, the user further operates the terminal device 300 to select the selection item 310 (selection item 310 indicated by reference numeral 8C in FIG. 8) corresponding to the first virtual screen 510.

Thus, as illustrated in FIG. 4, the first virtual screen 510 is newly displayed on the upper side of the display unit 101, and the third virtual screen 530 that has been displayed till then is displayed next to the terminal device 300.

In the present exemplary embodiment, the virtual screen corresponding to the latest selection item 310 selected by the user is displayed on the upper side of the display unit 101, which is a predetermined place.

Further, in the present exemplary embodiment, the virtual screen corresponding to the selection item 310 selected by the user before the latest selection item 310 is displayed next to the terminal device 300.

In the display system 1 of the present exemplary embodiment, both the operability of the user and the ease of viewing the image can be achieved.

In a case where an image is displayed on the display unit 101 which can be disposed in front of the user's face, as in the display device 100 of the present exemplary embodiment, the user can view the image on a large screen, which makes it easier to view the image.

On the other hand, in a configuration in which the user does not use the terminal device 300 but operates the display device 100 to select a selection item or the like, the operability of the user is lowered.

In a case where the selection item 310 is selected by performing an operation on the display device 100, for example, a touch panel that receives a selection from the user is displayed on the display device 100 as a virtual screen. Further, in this case, the operation of selecting the selection item 310 performed by the user in the air is grasped by recognizing the position of the user's fingertip or the like.

In this case, the operability is reduced as compared with the case where the user touches an existing screen to select the selection item 310. Further, in this case, the accuracy of selection of the selection item 310 tends to decrease.

On the other hand, in a case where the user operates the terminal device 300 to select the selection item 310, the user performs an operation on the actual screen, so that the user can easily select the selection item 310.

On the other hand, in a case where the user views the terminal device 300 to view the content or the like, the image viewed by the user becomes small, and it becomes difficult for the user to view the content or the like.

That is, in a case where the user uses only the display device 100 or only the terminal device 300, either the visibility or the operability is lowered.

On the other hand, as in the present exemplary embodiment, in a case where the terminal device 300 receives the selection of the selection item 310, and the display unit 101 of the display device 100 displays the content accompanying the selection of the selection item 310, both the user's operability and the ease of viewing the image can be achieved.

In the present exemplary embodiment, in a case where the third virtual screen 530 is displayed next to the terminal device 300, in a case where the display device 100 is the non-transparent display device 100, the part of the third virtual screen 530 that overlaps with the terminal device 300 is not displayed, so that the terminal device 300 can be easily viewed.

Further, even in a case where the display device 100 is the transparent display device 100, similarly, the part of the third virtual screen 530 that overlaps with the terminal device 300 is not displayed.

Further, in the present exemplary embodiment, as described above, the display of the third virtual screen 530 is changed according to the change in the position of the terminal device 300.

Specifically, in the present exemplary embodiment, with respect to the third virtual screen 530 which is the higher-ranked image, the CPU 111 changes the display position of the third virtual screen 530, according to the change in the position of the terminal device 300, as described above.

Specifically, the CPU 111 sets a position that does not overlap with the terminal device 300 of which position changes, as a change destination of the display position of the third virtual screen 530.

In a case where the position overlapping with the terminal device 300 is set as a change destination of the display position of the third virtual screen 530, it becomes difficult to view the terminal device 300, so that a position that does not overlap with the terminal device 300 of which position changes is set as a change destination of the display position of the third virtual screen 530.

In the present specification, the "position that does not overlap with the terminal device 300" refers to a position different from a position in which all parts of the third virtual screen 530 fit inside the outer peripheral edge 380 (see FIG. 5) of the terminal device 300 that is viewed through the display unit 101.

As illustrated in FIG. 5, in a case where at least a part of the third virtual screen 530 is located outside the outer peripheral edge 380 of the terminal device 300, it can be set that the change destination of the display position of the third virtual screen 530 is "a position that does not overlap with the terminal device 300".

In the present exemplary embodiment, the CPU 111 moves the third virtual screen 530 displayed on the display unit 101 along with the terminal device 300 that is visible through the display unit 101.

In this movement, the third virtual screen 530 is moved such that the terminal device 300 and the third virtual screen 530 do not overlap with each other.

In other words, the third virtual screen 530 is moved such that not all parts of the third virtual screen 530 fit inside the outer peripheral edge 380 of the terminal device 300.

In other words, in the present exemplary embodiment, the third virtual screen 530 is moved in a state in which the initial positional relationship between the terminal device 300 and the third virtual screen 530 is maintained.

On the other hand, the CPU 111 maintains the first virtual screen 510 illustrated in FIG. 5, which is a lower-ranked image, in a state of being displayed at a predetermined place, regardless of the change in the position of the terminal device 300, as described above. That is, the CPU 111 maintains the first virtual screen 510 in a state of being displayed on the upper side of the display unit 101.

In other words, in the present exemplary embodiment, the first virtual screen 510 is displayed close to the upper end portion 101E of the display unit 101, and the CPU 111 maintains the first virtual screen 510 in a state of being displayed close to the upper end portion 101E of the display unit 101, regardless of the change in the position of the terminal device 300.

The first virtual screen 510 may be displayed closer to another end such as the lower end portion 101F, the right end portion 101C, or the left end portion 101G of the display unit 101. In this case as well, the first virtual screen 510 is maintained in a state of being displayed closer to this end portion of the display unit 101, regardless of the change in the position of the terminal device 300.

In a case where the first virtual screen 510 is displayed closer to the end portion as in the present exemplary embodiment, the user can more easily view the terminal device 300, and the user can more easily operate the terminal device 300, as compared with the case where the first virtual screen 510 is displayed in the center of the display unit 101.

In the present exemplary embodiment, among the images displayed on the display unit 101, it can be regarded that the display is changed for the image having the first positional relationship with the terminal device 300 that is visible through the display unit 101.

Specifically, in the present exemplary embodiment, the third virtual screen 530 (see FIG. 4) can be regarded as an image having a first positional relationship with the terminal device 300, and in the present exemplary embodiment, and a process of changing the display position of the third virtual screen 530 having a first positional relationship with the terminal device 300 is performed.

In other words, in the present exemplary embodiment, among the images displayed on the display unit 101, the third virtual screen 530 displayed next to the terminal device 300 can be regarded as an image having a first positional relationship with the terminal device 300.

Then, in the present exemplary embodiment, a process of changing the display position of the third virtual screen 530 displayed next to the terminal device 300 is performed.

Further, in the present exemplary embodiment, among the images displayed on the display unit 101, it can be regarded that the image having a second positional relationship with the terminal device 300 that is visible through the display unit 101 is maintained in a state of being displayed at a predetermined place.

Specifically, in the present exemplary embodiment, the first virtual screen 510 located above or below the terminal device 300 can be regarded as an image having a second positional relationship with the terminal device 300.

In the present exemplary embodiment, as described above, the first virtual screen 510 having the second positional relationship is maintained in a state of being displayed at a predetermined place such as the upper side of the display unit 101.

Next, processing in a case where the user further selects the selection item 310 in a state where the first virtual screen 510 and the third virtual screen 530 are displayed on the display unit 101 will be described.

Specifically, for example, a process in a case where the user further operates the terminal device 300 and selects a new selection item 310 in the state illustrated in FIG. 4 will be described.

Figure 9:
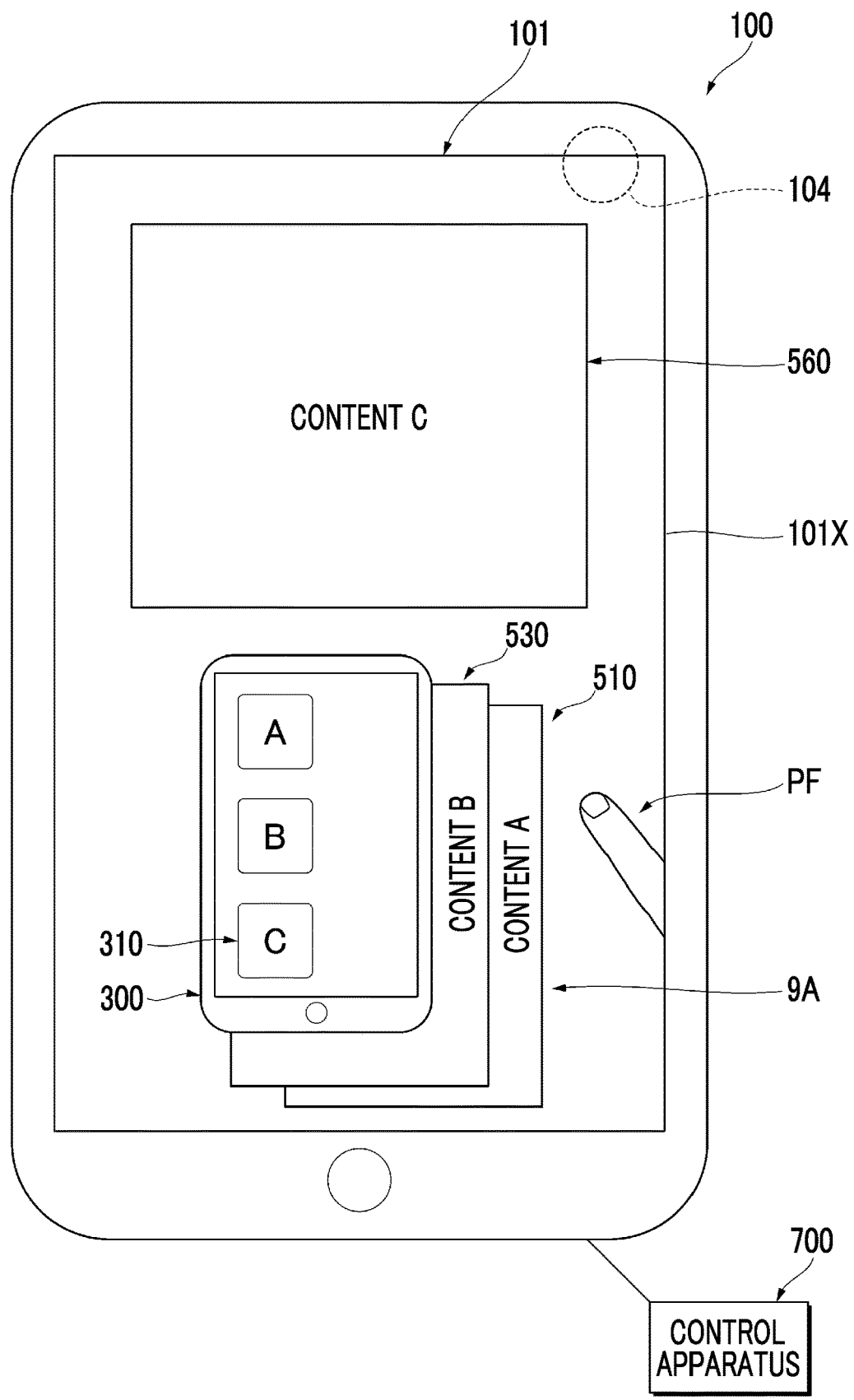
FIG. 9 is a diagram illustrating another display example in the display unit.

In the present exemplary embodiment, in a case where the user selects a new selection item 310, as illustrated in FIG. 9 (a diagram illustrating another display example on the display unit 101), a virtual screen 560 corresponding to the new selection item 310 is illustrated on the upper side of the display unit 101.

Further, in this case, the first virtual screen 510 that has been displayed till then on the upper side of the display unit 101 is displayed next to the terminal device 300 as illustrated by reference numeral 9A in FIG. 9. In other words, the first virtual screen 510 is displayed next to the terminal device 300 and next to the third virtual screen 530.

In this case, in a case where the terminal device 300 is moved, the first virtual screen 510 in addition to the third virtual screen 530 also moves along with the terminal device 300.

Further, in the present exemplary embodiment, the user can select a virtual screen displayed next to the terminal device 300. Specifically, in this example, the first virtual screen 510 and the third virtual screen 530 are displayed next to the terminal device 300, and the user can select one virtual screen from the first virtual screen 510 and the third virtual screen 530.

Then, in a case where the user selects one virtual screen, the selected virtual screen is displayed on the upper side of the display unit 101. Further, in this case, the virtual screen that has been displayed till then on the upper side of the display unit 101 is displayed next to the terminal device 300.

The selection of one virtual screen from the plurality of virtual screens displayed next to the terminal device 300 is performed, for example, by the user pointing to one virtual screen to be selected with a finger.

In a case where the user points to the virtual screen with a finger, the image of the finger is acquired by the camera 104. The CPU 111 analyzes this image obtained by the camera 104 to grasp the virtual screen located at the tip of the finger, and uses the grasped virtual screen as the virtual screen selected by the user.

Then, the CPU 111 displays the virtual screen selected by the user on the upper side of the display unit 101.

The display processing in the display unit 101 will be further described.

In the present exemplary embodiment, for example, in a case where the user's finger PF moves outside the outer peripheral edge 101X of the display unit 101 from the display state illustrated in FIG. 9, the display target on the display unit 101 is determined to be the virtual screen 560 displayed on the upper side of the display unit 101.

In other words, in the present exemplary embodiment, in a case where it is considered that the user has stopped the operation on the terminal device 300, the display target of the display unit 101 is determined to be a virtual screen (content) displayed on the upper side of the display unit 101 at that time.

Figure 10:
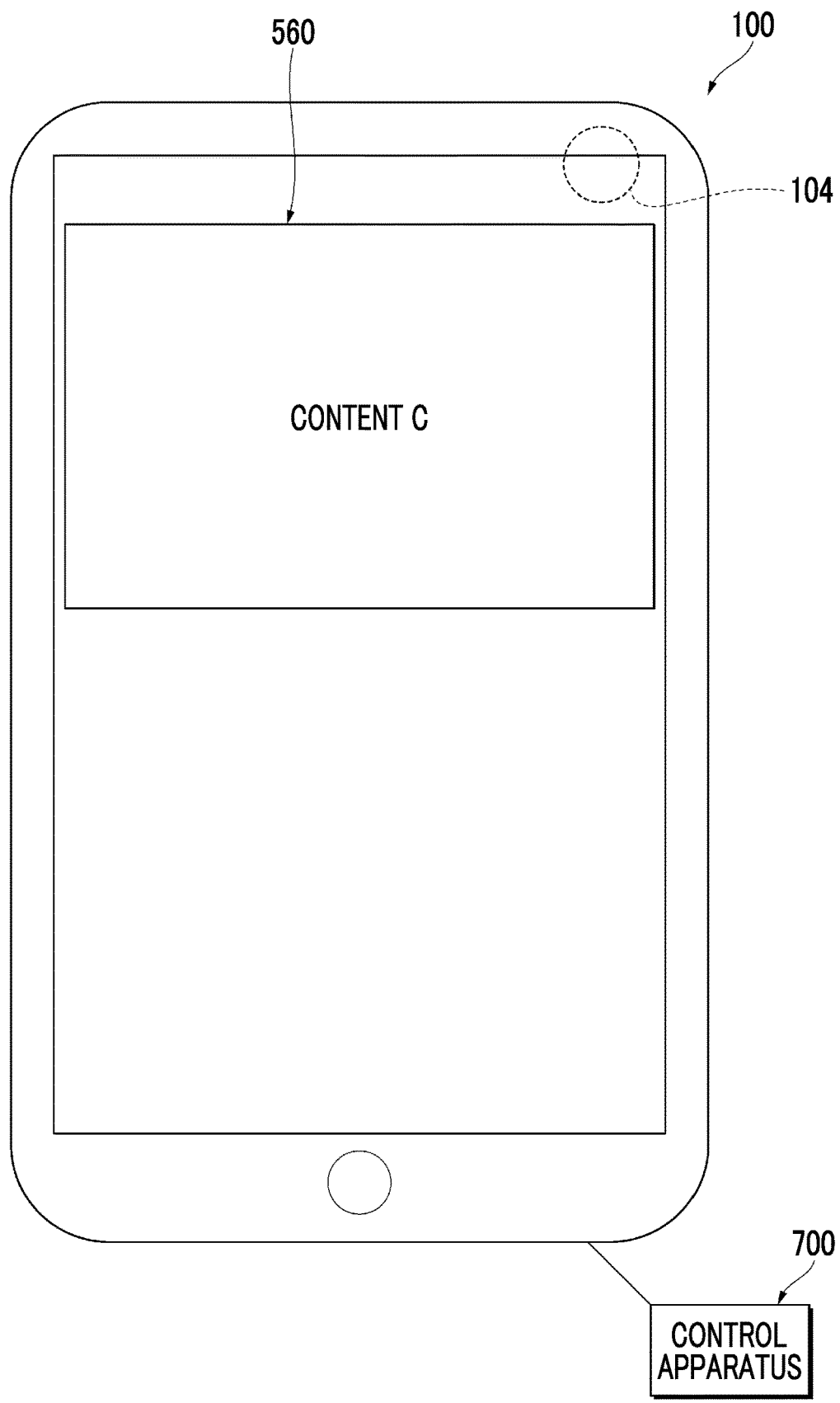
FIG. 10 is a diagram illustrating another display example in the display unit.

In this case, the CPU 111 switches the display contents of the display unit 101, and displays the virtual screen 560 in an enlarged state as illustrated in FIG. 10 (a diagram illustrating another display example on the display unit 101).

Here, a case where the display target is determined in a case where it is considered that the user has stopped the operation on the terminal device 300 has been described as an example.

However, the present invention is not limited to this, and the display target of the display unit 101 may be determined, for example, in a case where the user presses the determination button (not illustrated) displayed on the terminal device 300, or the like.

In addition, for example, in a case where the state in which the user's finger points to the virtual screen continues for a predetermined time or longer, this virtual screen may be determined to be the display target of the display unit 101.

In addition, the CPU 111 may maintain the first virtual screen 510 in a state in which the first virtual screen 510 is displayed on the display unit 101 in a case where the user looks in a specific direction.

Here, the first virtual screen 510 illustrated in FIG. 4 corresponds to the virtual screen most recently selected by the user, and the first virtual screen 510 may be maintained in a state in which the first virtual screen 510 is displayed on the display unit 101 in a case where the user looks in a specific direction.

In other words, in the above, the case where the state in which the first virtual screen 510 is displayed on the upper side of the display unit 101 is maintained has been described, but the first virtual screen 510 may be maintained in a state in which the first virtual screen 510 is displayed on the display unit 101 in a case where the user looks in a specific direction.

In other words, the virtual screen representing the latest content selected by the user and displayed on the upper side of the display unit 101 may be maintained in a state in which this virtual screen is displayed in a case where the user looks in a specific direction.

In the example illustrated in FIG. 4, the case has been described where the first virtual screen 510 is displayed on the upper side of the display unit 101 regardless of the direction in which the user faces. In this case, for example, the first virtual screen 510 is maintained in a state of being displayed on the upper side of the display unit 101, regardless of which direction the user wearing the wearable display device 100 faces.

On the other hand, as described above, in a case where the first virtual screen 510 is maintained in a state of being displayed on the display unit 101 in a case where the user looks in a specific direction, in a case where the user wearing the wearable display device 100 faces a direction other than the specific direction, the first virtual screen 510 is not displayed on the display unit 101.

On the other hand, in a case where the user wearing the wearable display device 100 looks in a specific direction, the first virtual screen 510 is displayed.

In this way, in a case where the first virtual screen 510 is displayed in a case where the user looks in a specific direction, the first virtual screen 510 is substantially in a state of being fixed to the specific place of the background displayed on the display unit 101. In other words, in a case where the first virtual screen 510 is displayed in a case where the user looks in a specific direction, the first virtual screen 510 is displayed at a specific place behind the display unit 101, the specific place being visible through the display unit 101.

Examples of a specific place where the first virtual screen 510 is displayed include a place behind the display unit 101 that satisfies a predetermined condition, and the first virtual screen 510 may be displayed at the place that satisfies the predetermined condition.

For example, the first virtual screen 510 may be displayed at a place where a flat wall is provided in the real space RW present behind the display unit 101.

More specifically, in a case where this process is performed, the image obtained by the camera 104 is analyzed to specify a place that satisfies the predetermined condition. Then, in a case where a place satisfying the predetermined condition is displayed on the display unit 101, the first virtual screen 510 is displayed on the specific place.

As described above, the third virtual screen 530 moves along with the terminal device 300.

Therefore, even in a case where the user wearing the wearable display device 100 is facing a direction other than the above-described specific direction, in a case where the terminal device 300 is located behind the display unit 101, the user views the third virtual screen 530 through the display unit 101.

Further, for example, when the user wearing the wearable display device 100 is facing a specific direction, in a case where the terminal device 300 is not located behind the display unit 101, the third virtual screen 530 is not displayed on the display unit 101.

Other Display Examples on the Display Unit 101

Figure 11:
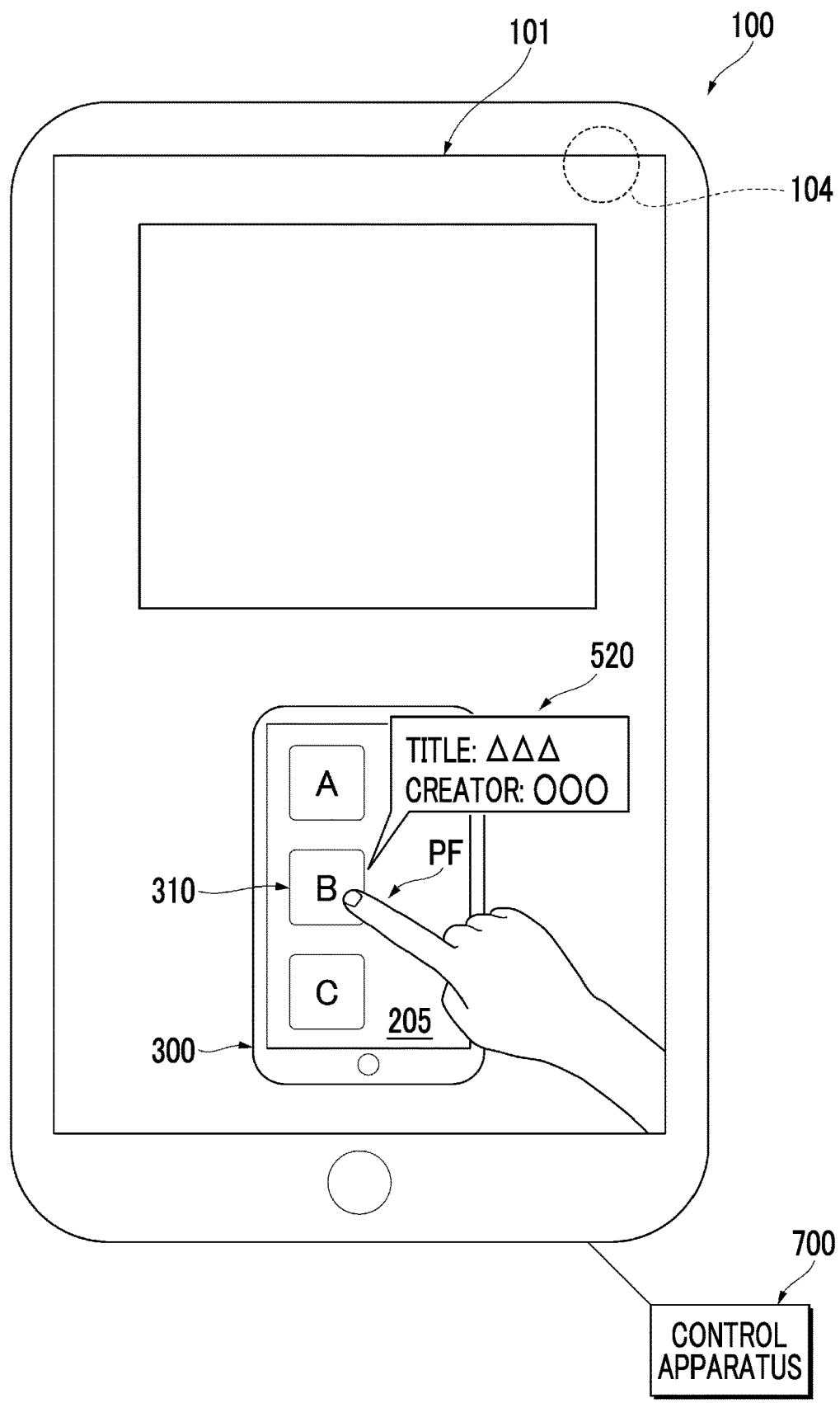
FIG. 11 is a diagram illustrating another display example in the display unit.

FIG. 11 is a diagram illustrating another display example on the display unit 101.

The second virtual screen 520 will be described with reference to FIG. 11.

The CPU 111 of the present exemplary embodiment further performs a process of displaying, on the display unit 101, information regarding the selection item 310 displayed on the terminal device 300.

In other words, as illustrated in FIG. 11, in a case where the user's finger PF has approached the selection item 310, the CPU 111 displays, on the display unit 101, information regarding the selection item 310 where the user's finger PF has approached.

In other words, as illustrated in FIG. 11, in a case where the user's finger PF approaches the selection item 310, the CPU 111 displays, on the display unit 101, a second virtual screen 520 which is a screen for displaying information regarding the selection item 310.

In the present exemplary embodiment, it is grasped whether or not the user's finger PF has approached the selection item 310 by analyzing the image acquired by the camera 104. In a case where the user's finger PF has approached the selection item 310, the selection item 310 that the user's finger PF has approached is grasped.

In the present exemplary embodiment, as illustrated in FIG. 11, the CPU 111 displays the second virtual screen 520 such that a part of the terminal device 300 and a part of the second virtual screen 520 overlap each other.

More specifically, in the present exemplary embodiment, for example, in a case where the second virtual screen 520 is displayed on the transparent display device 100, the second virtual screen 520 is displayed such that the terminal device 300 present in the real space (the terminal device 300 located behind the display unit 101) is displayed and the second virtual screen 520 partially overlap.

Further, for example, in a case where the second virtual screen 520 is displayed on the non-transparent display device 100, the second virtual screen 520 is displayed such that the terminal device 300 displayed on the display unit 101 and the second virtual screen 520 partially overlap each other.

Further, in the present exemplary embodiment, the second virtual screen 520 is displayed such that the second virtual screen 520 does not overlap the selection item 310.

In this example, the title of the content and information on the creator of the content are displayed on the second virtual screen 520.

The information included in the second virtual screen 520 is not limited to this, and other types of information may be included in the second virtual screen 520.

Specifically, for example, information such as the time required for viewing the content and the result of evaluation of the content by another user may be included in the second virtual screen 520.

Here, the case where the second virtual screen 520 for displaying the information regarding the selection item 310 is displayed in a case where the user's finger PF has approached the selection item 310 has been described.

However, the present invention is not limited to this, and for example, a place ahead of the user's line of sight may be grasped, and information regarding the selection item 310 ahead of the user's line of sight may be displayed as the second virtual screen 520.

Further, for example, in a case where the user touches the selection item 310 on the terminal display unit 205, the information regarding the selection item 310 touched by the user may be displayed as the second virtual screen 520.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus comprising:
a processor configured to:
control a display device equipped with a display screen so as to allow a user facing the display screen from a first side of the display screen to view through the display screen;
change a display location of a first image of a plurality of images displayed on the display screen, in response to a change in a position of a terminal device with respect to the display device, the terminal device being located in a second side of the display screen, the second side being opposite to the first side and viewed by the user through the display screen; and
maintain a display location of a second image of the plurality of images regardless of the change in the position of the terminal device, wherein the processor is configured to change the display location of the first image of the plurality of images displayed on the display screen comprising:
change the display location of the first image of the plurality of images by moving the first image to display next to terminal device displayed on the display screen.

2. The control apparatus according to claim 1,
wherein the second image of the plurality of images are displayed at predetermined places on the display screen, and
the processor is configured to maintain the second image of the plurality of images displayed at the predetermined places on the display screen regardless of the change in the position of the terminal device.

3. The control apparatus according to claim 1, wherein the first image has a first positional relationship with the terminal device that is displayed in a way as though the image is visible through the display screen and the second image has a second positional relationship with the terminal device.

4. The control apparatus according to claim 3, wherein the processor is configured to:
while the first image is displayed next to the terminal device
maintain the second image located above or below the terminal device that is visible through the display screen at the predetermined place.

5. The control apparatus according to claim 3, wherein the processor is configured to:
move the first image having the first positional relationship, in a same direction of movement of the terminal device, in response to the change in the position of the terminal device.

6. The control apparatus according to claim 1, wherein the processor is configured to:
display information regarding a selection item displayed on the terminal device, on the display screen.

7. The control apparatus according to claim 6, wherein the processor is configured to:
display the information regarding the selection item on the display screen, in a case where a user's finger approaches the selection item.

8. The control apparatus according to claim 1, wherein the processor is configured to:
out of a higher-ranked image which includes the first image having a higher order of display and a lower-ranked image which includes the second image having a lower order of display than the order of display of the higher-ranked image, among images sequentially displayed on the display screen by a user operating the terminal device, change display of the higher-ranked image, in response to the change in the position of the terminal device, and
maintain the lower-ranked image in a state of being displayed at a predetermined place, regardless of the change in the position of the terminal device.

9. The control apparatus according to claim 8, wherein the processor is configured to:
change a display position of the higher-ranked image, in response to the change in the position of the terminal device.

10. The control apparatus according to claim 9, wherein the processor is configured to:
set a position that does not overlap with the terminal device of which a position changes, as a change destination of the display position of the higher-ranked image.

11. The control apparatus according to claim 8, wherein the processor is configured to:
move the higher-ranked image displayed on the display unit along with the terminal device that is visible through the display screen.

12. The control apparatus according to claim 8, wherein the processor is configured to:
maintain the lower-ranked image in a state of being displayed closer to either an upper end portion or a lower end portion of the display unit, regardless of the change in the position of the terminal device.

13. The control apparatus according to claim 8, wherein the processor is configured to:
display the lower-ranked image at a specific place behind the display screen, the specific place being visible through the display screen.

14. The control apparatus according to claim 1, wherein the processor is configured to:

display images of the plurality of images other than the first image and the second image at specific places behind the display unit, the specific places being visible through the display screen.

15. A display system comprising:
the terminal device
a display device equipped with the display screen; and
a control apparatus that controls the display device, wherein the display device allows a user to view back of the display unit through the display unit in a case where the user views the display unit, and
the control apparatus according to claim 1.

16. A method of controlling a display device having a display screen, applicable to a control apparatus having a processor, the method comprising:
controlling the display device equipped with the display screen so as to allow a user facing the display screen from a first side of the display screen to view through the display screen;
changing a display location of a first image of a plurality of images displayed on the display screen, in response to a change in a position of a terminal device with respect to the display device, the terminal device being located in a second side of the display screen, the second side being opposite to the first side and viewed by the user through the display screen; and
maintaining a display location of a second image of the plurality of images regardless of the change in the position of the terminal device, wherein the processor is configured to change the display location of the first image of the plurality of images displayed on the display screen comprising:
changing the display location of the first image of the plurality of images by moving the first image to display next to terminal device displayed on the display screen.

17. A non-transitory computer readable medium storing a program causing a processor of a control apparatus to execute:
controlling the display device equipped with the display screen so as to allow a user facing the display screen from a first side of the display screen to view through the display screen;
changing a display location of a first image of a plurality of images displayed on the display screen, in response to a change in a position of a terminal device with respect to the display device, the terminal device being located in a second side of the display screen, the second side being opposite to the first side and viewed by the user through the display screen; and
maintaining a display location of a second image of the plurality of images regardless of the change in the position of the terminal device, wherein the processor is configured to change the display location of the first image of the plurality of images displayed on the display screen comprising:
changing the display location of the first image of the plurality of images by moving the first image to display next to terminal device displayed on the display screen.

18. A control apparatus comprising:
a processor configured to:
control a display device equipped with a display screen so as to allow a user facing the display screen from a first side of the display screen to view through the display screen;
display a first virtual screen and a second virtual screen on the display screen of the display device in response to the user operating on a terminal device;
change a display location of the first virtual screen displayed on the display screen, in response to a change in a position of a terminal device with respect to the display device, the terminal device being located on a second side behind the display screen, the second side is opposite to the first side, and viewed by the user through the display screen; and
maintain a display location of the second virtual screen as displayed on the display screen in at a predetermined location, regardless of the change in the position of the terminal device.

* * * * *